United States Patent [19]
Hall et al.

[11] Patent Number: 5,439,342
[45] Date of Patent: Aug. 8, 1995

[54] SAFETY BARRIER/RAMP ACTUATING MECHANISM FOR WHEELCHAIR LIFTS

[75] Inventors: John C. Hall, Hayward; Lee B. Petersen, Jr., Castro Valley, both of Calif.

[73] Assignee: All American Transit Parts, Inc., Oakland, Calif.

[21] Appl. No.: 198,227

[22] Filed: Feb. 18, 1994

[51] Int. Cl.⁶ .............................................. B60P 1/46
[52] U.S. Cl. ................................... 414/545; 414/921; 105/447; 280/166
[58] Field of Search ............... 414/540, 541, 545, 787, 414/921, 556; 280/166, 163, 164.1; 105/431, 447, 448, 437, 438, 430; 108/112, 102

[56] References Cited

U.S. PATENT DOCUMENTS

| | | | |
|---|---|---|---|
| Re. 33,595 | 5/1991 | Thorley et al. | 414/921 X |
| 4,027,807 | 6/1977 | Thorley | 105/448 X |
| 4,081,091 | 3/1978 | Thorley | 105/448 X |
| 4,176,999 | 12/1979 | Thorley | 280/176 X |
| 4,251,179 | 2/1981 | Thorley | 414/545 |
| 4,441,850 | 4/1984 | Thorley | 414/545 |
| 4,466,771 | 8/1984 | Thorley et al. | 414/921 X |
| 4,556,128 | 12/1985 | Thorley et al. | 414/540 X |
| 5,284,414 | 2/1994 | Kempf | 414/921 X |

Primary Examiner—Michael S. Hupert
Assistant Examiner—James T. Eller, Jr.
Attorney, Agent, or Firm—Bruce & McCoy

[57] ABSTRACT

An improved safety barrier/ramp actuation mechanism for combination folding stair and platform wheelchair lifts which translate from one configuration to the other depending upon the purpose to be served and have a combination safety barrier/ramp at the outboard end of the platform, the mechanism comprising a triple link mechanism and internally contained piston and bellcrank for reciprocating said barrier/ramp, and a pressure relief for said system to prevent raising said barrier/ramp when a load is resting thereon in ramp position, and the invention includes new steps in the method of operation of the stair and lift combination to enhance the safety thereof.

8 Claims, 2 Drawing Sheets

SAFETY BARRIER/RAMP ACTUATING MECHANISM FOR WHEELCHAIR LIFTS

BACKGROUND OF THE INVENTION

1. Field of the Invention

The present invention relates to wheelchair lifts or elevators and, more particularly, to combination stair and folding platform wheelchair lifts which translate from one configuration to the other depending upon the purpose to be served. Still more particularly, the present invention relates to an improved safety barrier/ramp actuating mechanism for said lifts and the method of operation thereof.

The improved safety barrier/ramp actuating mechanism of the present invention is especially adapted to wheelchair lifts having a safety barrier horizontally hinged to the bottom step of a combination stair and folding platform wheelchair lift wherein the bottom step in the stair configuration forms the outer panel of the platform configuration of the lift.

The invention includes a safety mechanism for preventing said barrier/ramp from actuating when the barrier is disposed as a ramp and a load is imposed thereon in excess of a preselected limit.

The present invention also relates to an improved method of operation of the various procedural steps which occur during the transformation of the wheelchair lift from a folding stair configuration to a platform configuration and during reconfiguring back to the folding stair configuration.

2. Description of the Prior Art

The art of combination folding stair and platform wheelchair lifts, which translate from one configuration to the other, depending upon the purpose to be served, is well-developed.

An example which illustrates the environment of the present invention is disclosed in U.S. patent Ser. No. 4,027,807 for a Wheelchair Lift, issued Jun. 7, 1977, to Graham R. Thorley. Thereshown is an elevator or lift for a wheelchair, or physically impaired person, which is particularly adapted to replace the entrance/exit stairs of a public transportation vehicle such as a bus, trolley, or light rail train car.

The Thorley '807 patent discloses a set of stairs having a lower step (A) which forms an outer panel of the lift when the stair/panel is transformed into a part of the lift platform (10) to operate as an elevator. The outer projecting end panel (50) of the platform serves as a ramp at the end of the platform and includes a safety flap (51) which flips upward from the panel to prevent a wheelchair from rolling off during vertical motion of the platform (Col. 2, lines 26-33). This safety barrier arrangement proved inadequate.

An improved version of the safety barrier/ramp combination end panel of the lift platform is disclosed in the patents of Donald B. Sullivan and Graham R. Thorley, the most recent of which was reissued May 28, 1991, as U.S. Pat. No. Re. 33,595 for Wheelchair Lift. The basic patent application was filed Sep. 27, 1982, and has issued as several different patents based on divisional and continuation-in-part applications. Therein disclosed is a wheelchair lift similar to the device of the Thorley '807 patent and which converts between a folding stair and raisable and lowerable platform configurations. The extended or outboard end of the platform configuration includes a panel which converts between a bottom step tread, a raisable safety barrier, and a wheelchair ramp.

Wheelchair lifts are presently made in the convertible stair/platform configuration for a specific purpose which is to be installed or retrofitted into the door system of a bus to permit wheelchair users to have access to public transportation as mandated by federal regulations. The wheelchair lift collapses into a stair configuration within the door system of a bus to permit use by fully mobile persons. However, once the doors are open, the stair configuration can be transformed first into a floor level platform by collapsing the stairs into a horizontal platform which projects outward from the bus so that it extends beyond the side thereof for a sufficient distance to extend over a curb. The stairs, upon flattening, are typically disposed at bus floor level which permits a wheelchair-bound or physically-impaired person inside the bus to roll or step onto the platform and then be lowered to the ground. Alternatively, upon extension, the platform can be lowered either to ground or curb level to permit a wheelchair or physically impaired person to be rolled or step thereon and then lifted to bus floor level for movement into the bus. The bus driver/wheelchair lift operator thereafter transforms the lift back into a stair configuration and the doors are closed.

Once the platform has been raised to bus floor level and the wheelchair moved into the bus, the lift operator selects the step configuration control. The barrier/ramp then retracts inward around the outboard end of the platform to lie flat on top of the outer panel of the platform during the transformation of the lift from platform to stair configuration at which time the barrier/ramp then serves the function as the tread of the bottom step of the stair configuration of the wheelchair lift.

These designs of the prior art have specific deficiencies which are capable of causing injury to passengers when there is a malfunction or they are operated incorrectly. The present invention overcomes these problems and provides a new and improved safety barrier/ramp actuating mechanism and an improved method of control for operating the combination folding stair and platform wheelchair lifts.

SUMMARY OF THE INVENTION

The present invention is an improved safety barrier/ramp actuating mechanism for combination folding stair and platform wheelchair lifts which translate from one configuration to the other depending upon the purpose to be served. The combination folding stair and platform wheelchair lift has a horizontally disposed panel forming both the bottom step of the folding stair configuration of the stair and lift as well as the outer horizontally projecting lift panel of the platform configuration thereof depending upon in which configuration of the stairs or platform the combination has been positioned. The combination stair and lift includes a safety barrier/ramp panel which is pivotally hinged proximate to the outer edge of the horizontally disposed bottom step/outer panel. When the barrier/ramp is disposed in a retracted substantially horizontal position, it is folded flat against the bottom step on top thereof and acts as a tread for the lower stair step of the folding stair configuration. The barrier/ramp is pivotable to a substantially vertical projecting raised barrier position and also to a substantially horizontal extended position in a ramp configuration at the end of the outer panel when the lift is disposed in the platform configuration.

The improved safety barrier/ramp actuating mechanism comprises a slide plate which is disposed internally of the bottom step/outer panel and arranged to reciprocate horizontally and perpendicular to the pivot or hinge axis of the barrier/ramp. A connecting linkage is secured between the slide plate and the barrier/ramp. The linkage can be retracted between the outer panel and the barrier/ramp when the barrier/ramp is retracted to form the tread of the lower stair step. The linkage also allows the barrier/ramp to depend downward from the outer panel without lockup when the barrier/ramp is disposed in the ramp configuration whereby as the slide plate reciprocates between its limits of motion, the barrier/ramp moves between its retracted, raised, and extended positions. A means is provided for reciprocating the slide plate between its limits of motion to raise and lower the barrier/ramp.

OBJECTS OF THE INVENTION

It is therefore an important object of the present invention to provide an improved safety barrier/ramp actuating mechanism for combination folding stair and platform wheelchair lifts.

It is another object of the present invention to provide a safety mechanism for safety barriers for combination folding stair and platform wheelchair lifts that prevents raising of the safety barrier when the barrier/ramp is extended in the ramp position and is carrying a load.

It is a further object of the present invention to provide an improved method of control for operating combination folding stair and platform wheelchair lifts.

Other objects and advantages of the present invention will become apparent when the apparatus of the present invention is considered in conjunction with the accompanying drawings.

DESCRIPTION OF THE PREFERRED EMBODIMENT

Reference is made to the drawings for a description of the preferred embodiment of the present invention wherein like reference numbers represent like elements on corresponding views.

In the improved versions of the wheelchair lifts of the prior art, a necessary part of the mechanism is a raisable and lowerable barrier/panel which is disposed at the extended end of the platform to prevent a wheelchair from rolling off the platform during the lift and lowering cycles as disclosed in the Sullivan '595 reissue patent. The barrier/ramp serves three functions in both the prior art and the present invention as will be explained in the following description.

Figure 1:
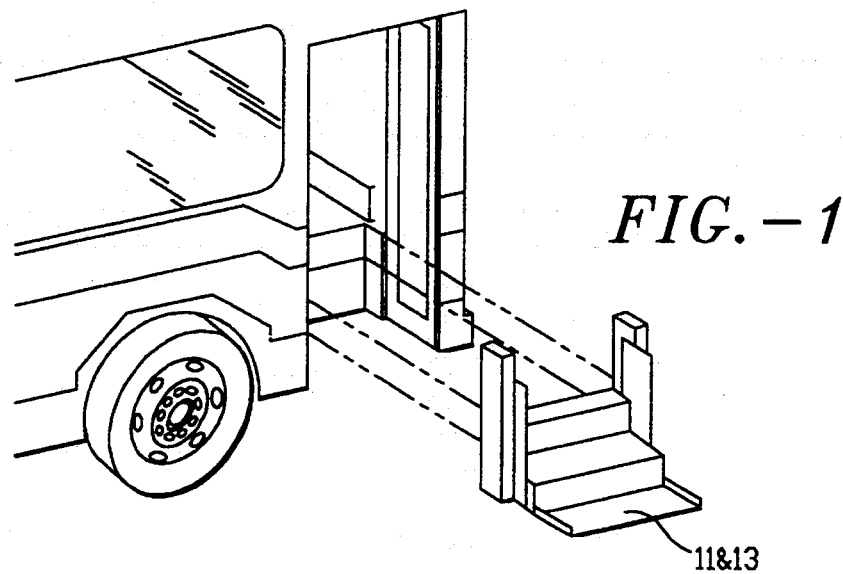
FIG. 1 is a perspective view of a combination folding stair and platform wheelchair lift unit arranged in stair configuration set out from its operating position in a bus.
Figure 2:
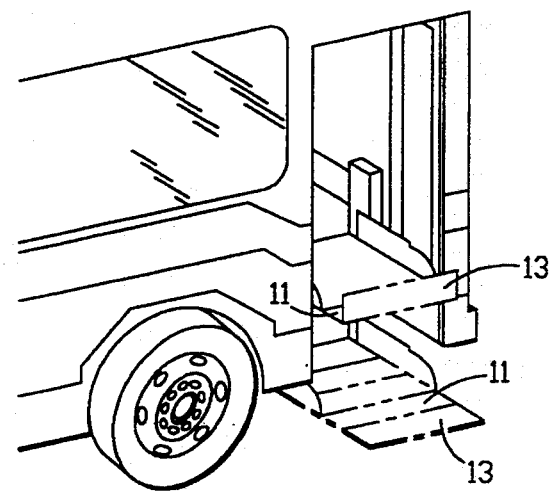
FIG. 2 is a perspective view illustrating the stair and platform lift of FIG. 1 positioned in a bus in the platform configuration in two alternative positions: raised with the safety barrier/ramp erected, and lowered with the barrier in ramp configuration.

Reference is made to FIGS. 1 and 2 of the drawings accompanying this specification. Illustrated therein as part of the folding stair configuration of a wheelchair lift is the bottom step which also forms the outer supporting panel 11 of the platform lift. It is actually comprised of several elements and has another panel attached to it, the safety barrier/ramp panel 13, which performs the three different functions depending upon the panel orientations and the configuration and positioning of the wheelchair lift.

The present invention provides an improved actuating mechanism for the safety barrier/ramp panel 13 as employed in combination folding stair and platform wheelchair lifts having a horizontally-disposed panel 11 forming the bottom step of the folding stair configuration of the lift and in which the panel also forms the outer horizontally projecting panel of the platform configuration of the lift. The safety barrier/ramp panel is pivotally secured to the bottom step/outer panel of the lift with a horizontal hinge connection 15 at the outer edge thereof.

The safety barrier/ramp 13 three functions depend upon the orientation of the panel. When the lift is retracted to the stair configuration shown in FIG. 1, the barrier panel is disposed in a substantially horizontal collapsed position folded flat on top of the lower step/outer panel 11 and acts as a stair tread for the bottom step. Alternatively, when the lower step/outer panel is extended as the lift transforms to the platform configuration as shown in FIG. 2 (illustrated as both raised and lowered), the safety barrier pivots to a substantially vertical projecting barrier position (FIG. 5, raised position) to prevent wheelchairs from rolling off the end of the platform configuration of the lift. The barrier remains raised during transit of the lift between its high and low positions, and while the lift is stopped in the high or dock position. When the platform is to be loaded or unloaded at ground, sidewalk, or street level, the barrier can then be lowered from its vertical orientation to an outward projecting and slightly downward drooping position (FIG. 2, lowered position) to form a ramp to permit a wheelchair to roll on or off the end of the platform between the sidewalk or street surface and the platform. For this purpose, the barrier/ramp can be beveled or tapered, at least at the end thereof, and configured in relation to the platform outer panel to provide a transition from the thickness of the outer panel to a sidewalk surface or the like so that a wheelchair does not need to traverse over a large bump at the end of the ramp.

Figure 4:
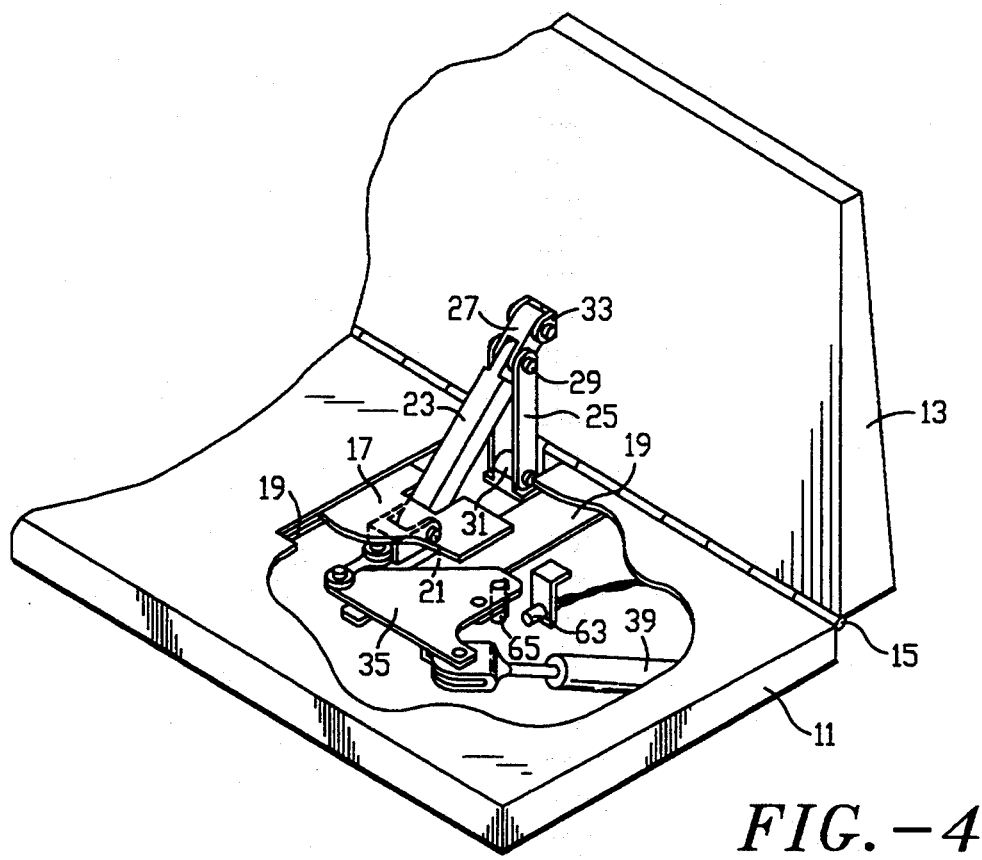
FIG. 4 is a perspective view of the lower step/outer panel of the combination stair and platform wheelchair lift with the safety barrier/ramp panel hinged thereto, said panels being partially broken out to show the operating mechanism for the barrier/ramp.
Figure 5:
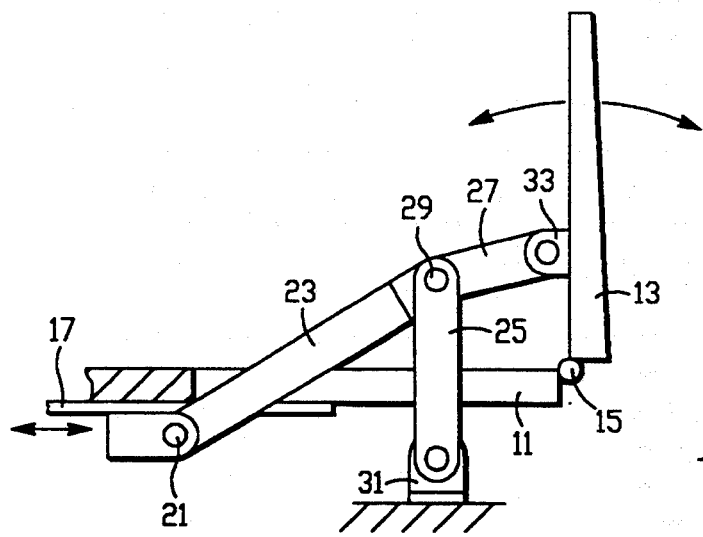
FIG. 5 is a side elevation in partial cross-section illustrating the operating mechanism of FIG. 4 with the safety barrier/ramp erected in barrier position.
Figure 5A:
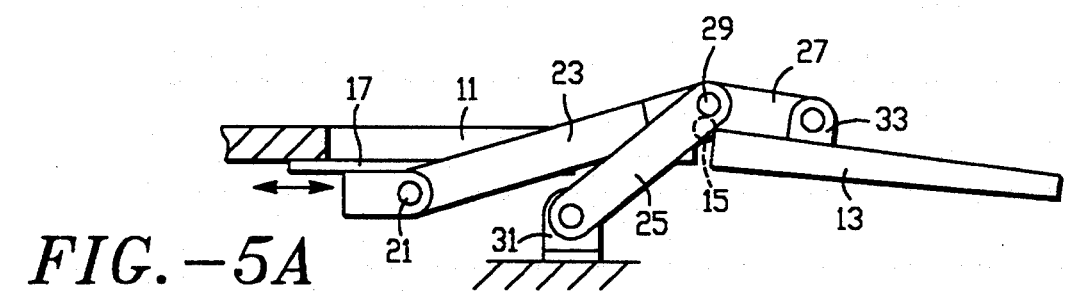
FIG. 5A is an alternative view of FIG. 5 illustrating the barrier/ramp lowered in ramp position.

Reference is made to FIGS. 4–5A of the drawings. The improved safety barrier/ramp panel actuating mechanism comprises in part a slide plate 17 which is disposed substantially internally of the outer panel 11 of the platform configuration of the lift and mounted in slide rails 19. The slide plate is arranged to reciprocate horizontally and perpendicular to the pivot or hinge axis 15 of the safety barrier/ramp 13. A pivot pin mount 21 is secured to the slide plate and projects through a slot in the top surface of the outer panel of the wheelchair lift for the length of the slide plate's horizontally reciprocating travel. The mount in its simplest form is a vertically standing post with a horizontally disposed cylindrical hole through it with the axis of said hole disposed parallel to the pivot or hinge axis of the barrier/ramp.

A connecting linkage comprised of several elements is secured between the slide plate pivot pin mount 21 and the safety barrier/ramp panel 13. It includes a drag link 23, a toggle link 25, and a barrier grab link 27 whereby as the slide plate 17 reciprocates between its limits of motion, the barrier/ramp moves between its retracted, raised, and extended positions.

The drag link 23 is pivotally secured at a first end thereof to the pivot mount 21 on the slide plate and at the opposite second end thereof to a common pivot pin 29. All three links have one end thereof interconnected together by the common pivot pin which in the preferred form of the invention is a cylindrical pin having its cylindrical axis disposed parallel the pivot axis 15 of the barrier/ramp 13. The pin is provided with flanged ends to prevent it from slipping out of its engagement with the three links.

The toggle link 25 is pivotally secured at a first end thereof to a pivot mount 31 disposed at a position so that when the barrier/ramp panel 13 is in the safety barrier position, the toggle link extends essentially vertically from its pivot mount which is secured to the frame of the lift on a cross-member. The opposite second end of the toggle link is engaged to the common pivot pin 29 whereby the toggle link pivots about its mount and connection to the outer panel as the drag link 23 is reciprocated by the slide plate 17. The toggle link must be of a length to keep the common pivot pin above the hinge axis 15 of the safety barrier/ramp when it is in ramp position to prevent a lockup as will be explained hereinafter.

The pivot mount 31 for the toggle link 25 is partially recessed in the bottom step/outer panel 11 so that it does not interfere with the barrier/ramp 13 when the wheelchair lift is retracted to the stair configuration and when the barrier/ramp has been retracted to its flat inward projecting position on top of the bottom step/outer panel 11 and forms the stair step tread. The partial recessing of the mount is also designed to prevent it from projecting very high above the surface of the outer panel when the barrier/ramp is extended into the ramp configuration so that it does not interfere with wheelchair travel on the panel. The result is that the linkage can be retracted between the outer panel and the barrier/ramp when the barrier/ramp is retracted to form the tread of the lower stair step. The use of a single linkage disposed in the center of the platform minimizes the possibility of interference.

The barrier grab link 27 is pivotally secured at a first end thereof to the barrier/ramp panel 13 by a pivot mount 33 at a position displaced outboard from the hinge connection 15 of the barrier/ramp to the outer panel 11. The displaced position of the pivot mount on the barrier/ramp provides a lever arm action which permits a longitudinal force on the grab link to rotate the safety barrier panel about its hinge connection to the bottom step/outer panel. The opposite second end of the grab link is pivotally engaged to the common pivot pin 29 whereby either a tension or compression force can be imposed on the barrier grab link by the drag link 23 to permit the safety barrier panel to rotate alternately around the hinge connection. Similar to the toggle link pivot mount 31 on the bottom step/outer panel, the barrier grab link pivot mount 33 on the safety barrier panel can be partially recessed therein so that it does not project very high above the upper surface of the barrier/ramp when it is disposed in the ramp configuration to interfere with wheelchair travel on the ramp.

In operation, the safety barrier 13 when it moves to the ramp position is usually arranged to depend or droop slightly downward from its hinge connection 15 to the outer panel 11. If the drag link 23 is secured directly between the safety barrier panel and the slide plate 17, and the panel dropped below the hinge axis, thereby also pulling the drag link below that same axis, the safety barrier actuating mechanism would lock up and the barrier/ramp could not be raised. The toggle link 25 keeps the drag link interconnection to the barrier grab link from dropping into a lock-up position by keeping the common pivot pin 29 above the axis of the hinge interconnection of the barrier/ramp with the bottom step/outer panel.

The actuating mechanism for the connecting linkage which moves the barrier/ramp 13 is the slide plate 17 which reciprocates in its guides 19. The slide plate can be powered by any means which moves it to position the barrier/ramp panel at its three positions. In the preferred embodiment, a safety feature can be employed to prevent raising the barrier/ramp panel when a wheelchair or person is disposed on top of it in the ramp position. To house the actuating mechanism in the outer lift panel 11, the slide plate is motivated by a horizontally disposed bellcrank 35 which is pivotally secured to the bottom step/outer panel internally thereof at a position intermediate the ends of the bellcrank at the crank intersect. A connecting rod 37 interconnects the first end of the bellcrank and the slide plate.

A hydraulic cylinder 39 is provided for actuating the bellcrank 35 which in turn moves the slide plate 17 to pivot the safety barrier/panel 13. The hydraulic cylinder has one end thereof pivotally secured to a sideframe member of the lift internally of the bottom step/outer panel 11. The other end of the cylinder is pivotally secured to the second end of the bellcrank. Alternating operation of the cylinder rotates the bellcrank to reciprocate the slide plate between its limits of motion with an intermediate stop at the raised safety barrier position. Obviously, the cylinder could be powered by air pressure if the vehicle has an air pressure system. Alternatively, an electric motor or even a three-position solenoid could be used to drive the connecting linkage. However, the use of a hydraulic circuit to power the mechanism allows new and important safety features to be incorporated in the design by allowing an overload on the barrier/ramp to prevent it from being raised. It also allows a variable speed of operation to be easily achieved for faster cycle times.

Figure 3:
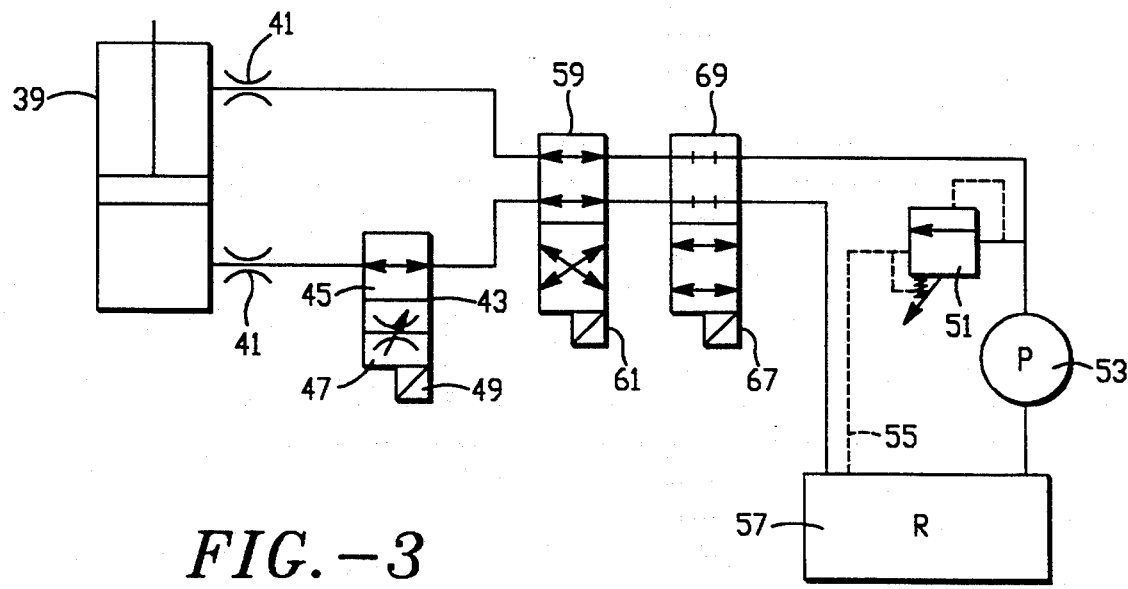
FIG. 3 is a schematic diagram of a portion of the hydraulic circuit which operates the safety barrier/ramp.

Reference is made to FIG. 3 of the drawings. The hydraulic circuit which supplies fluid to the cylinder has at least two different operating conditions. The hydraulic pump fluid output circuit which powers the cylinder includes two alternate orifices controlled by the logic circuits which are driven by the operator control switches. The orifices are automatically selected by the logic circuit depending upon the barrier/ramp mode or position called for by the operator. A larger orifice for the pump output permits faster operation of the barrier/ramp panel movement when the safety barrier/ramp transitions between steptread to safety barrier or the reverse. It is automatically selected by the lift operator initiating configuration transition of the stair and lift combination. This configuration transition only occurs when the lift is unloaded. Conversely, when the lift is loaded with a wheelchair or person, a slower transition of the barrier/ramp is required for safety. Therefore, a smaller orifice is automatically remotely activated or placed on-line in the pump output circuit by the lift operator initiating transition of the barrier/ramp panel to safety barrier from ramp or the reverse.

The hydraulic circuit has inherent normal restrictions 1 at the inlet and outlet of the cylinder 39 which control flow rates in the cylinder. These constitute the larger orifice which permit the fastest operation of the cylinder. A supplemental valve 43 in the circuit has a pair of orifices that can be alternated into and out of the circuit to control the hydraulic fluid flow rate. One orifice 45 permits free flow of fluid through the valve and the other orifice 47 is variable and can be adjusted for a preselected flow rate. It is used to slow the flow rate by placing a smaller orifice in the hydraulic circuit. The valve is actuated by a solenoid 49 to switch the orifices. The solenoid, in turn, is controlled by the switches actuated by the lift operator as previously described. The adjustable flow smaller orifice is automatically switched on-line when the operator actuates the safety barrier/ramp panel to move from ramp position to barrier and the reverse. The free flow (larger) orifice is automatically switched on-line when the operator actuates the wheelchair lift to move from stair configuration to platform or the reverse and the barrier/ramp is automatically actuated to rotate from stair step tread to safety barrier and the reverse.

The improved actuating mechanism of the present invention also includes a safety feature which prevents the safety barrier/ramp panel 13 from being raised from its ramp configuration when there is a load in excess of a preselected limit imposed thereon. This is accomplished by providing an internal fluid pressure release in the hydraulic circuit where the hydraulic fluid recirculates until the load is removed from the ramp panel. The safety barrier/ramp panels of the prior art without a safety provision repeatedly flipped wheelchairs when the barrier/ramps were untimely actuated.

The hydraulic circuit includes a bypass valve 51 for the pump 53 which supplies fluid to the cylinder 39, and a fluid return loop 55 returns fluid shunted by the bypass valve to the fluid reservoir 57. When the barrier/ramp 13 is disposed in the extended horizontal ramp position, and a load is imposed on the barrier/ramp panel, the hydraulic pump increases the pressure to actuate the cylinder and raise the ramp, but the pressure relief valve opens at the preselected pressure. This safety mechanism prevents the safety barrier/ramp from pivoting on its hinge 15 to its raised position when a load in excess of approximately fifteen pounds is imposed on the barrier/ramp panel. The bypass valve can actually be arranged internal to the pump as well as located externally in the hydraulic circuit.

In the hydraulic fluid circuit of the present invention, a reversing valve 59 actuated by the solenoid 61 switches the output of the pump to actuate the cylinder in either direction depending upon which function switch the operator selects. The pressure release valve 51 shunts hydraulic fluid directly to the fluid reservoir 57 if a load on the barrier/ramp, when it is in the ramp position, prevents it from raising and allowing the cylinder to move whereby pressure builds up in the circuit. When the load is removed from the ramp, it allows the cylinder to move the ramp thereby lowering the pressure in the circuit and closing the pressure release bypass valve whereby the cylinder moves the connecting linkage and the ramp rotates up and completes the transition into a safety barrier.

The logic control circuit also includes a proximity sensor switch 63 which senses the proximity of a moving element of the actuating mechanism when the barrier/ramp is disposed in the vertically projecting position. In the preferred embodiment, a metal mass 65 is attached to the bellcrank 35 and travels in an arc as the barrier/ramp rotates around its hinge 15. The switch controls the solenoid which actuates the open/closed diverter valve 69 which in turn controls the position of the hydraulic cylinder 39.

The improved safety barrier/ramp actuating mechanism of the present invention also includes an improved method of operation for a combination folding stair and platform lift having a barrier/ramp panel which rotates about a hinged edge at the outboard end of the lift platform and in which the safety barrier retracts to a substantially horizontal position flat against an adjacent panel or can be raised to substantially a vertical upward projecting barrier position and to a substantially horizontal extended position in a ramp configuration. The improved method includes a logic control circuit which raises the safety barrier automatically by an electrically-controlled hydraulically-actuated mechanism. The logic control circuits of the improved method are driven by the operator control switches. The method includes the step of stopping the hydraulic actuation when the barrier is raised to a substantially vertical position by providing an electronic proximity switch which senses the position of the barrier when it reaches the position selected by the operator or the logic circuit control and the diverter valve stops fluid flow to the hydraulic cylinder.

Similar and other proximity sensors are utilized to determine when the lift platform is loaded and when it has grounded on contacted a curb or the street at the bottom of the lowering cycle. When it is loaded, and when the platform is docked in the raised position, the platform deforms when a load is placed thereon and a proximity sensor senses the deflection and the logic circuit prevents the transition to steps configuration switch from actuating the mechanism. Sensor arms depend below the lift platform at several locations therealong to sense the ground or a curb and as a result of contact therewith to close a switch. In this condition, the logic circuit allows actuation of the safety barrier to ramp switch to lower the barrier/ramp panel. In other words, a ground sensor must be actuated by the platform lowering to ground level before the barrier to ramp switch will actuate the barrier/ramp panel to lower to the ramp configuration. In similar fashion, either a proximity sensor, or a full up sensor, must be actuated by the wheelchair lift being in the full up or docked position before the steps configuration actuation switch will work.

The safety methods of the invention designed into the logic circuit also prevent the barrier retract switch from being actuated incorrectly by, in addition to providing an electrical safety sequence that requires the wheelchair lift to be at full "dock" or up position before either the steps configuration actuation switch or the barrier retract actuation switch can be actuated, requiring both of those switches to be activated simultaneously for the actuations to occur.

The preferred embodiment of the invention is also provided with a lift actuation logic circuit which requires the barrier proximity sensors to be activated by a vertically projecting barrier before the lift raise or lower actuation switches can be actuated. All of these safety features are integrated into an improved method of operation for the combination folding stair and platform lift of the present invention.

Thus it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

I claim:

1. An improved safety barrier/ramp actuating mechanism for combination folding stair and platform wheelchair lifts which translate from one configuration to the other depending upon the purpose to be served, said combination stair and lift having a horizontally disposed panel forming both the bottom step of the folding stair configuration of said combination as well as the outer horizontally projecting lift panel of the platform configuration of said combination depending upon in which configuration of the stairs or platform the combination has been positioned, said combination including a safety barrier/ramp panel which is pivotally hinged about a pivot/hinge axis proximate to the outer edge of said horizontally disposed bottom step/outer panel, said barrier/ramp being disposed in a retracted substantially horizontal position folded flat against said bottom step on top thereof and acting as a tread for the lower stair step of said folding stair configuration, said barrier/ramp being pivotable to a substantially vertical projecting raised barrier position and subsequently to a substantially horizontal extended position in a ramp configuration at the end of said outer panel when said lift is disposed in said platform configuration, the improved safety barrier/ramp actuating mechanism comprising a slide plate disposed internally of said bottom step/outer panel and arranged to reciprocate horizontally and perpendicular to the pivot/hinge axis of said barrier/ramp, a connecting linkage secured between said slide plate and said barrier/ramp, said linkage being retracted between said bottom step/outer panel and said barrier/ramp when said barrier/ramp is retracted to form the tread of said lower stair step, said linkage allowing said barrier/ramp to depend downward from said outer panel without lockup when said barrier/ramp is disposed in said ramp configuration, whereby as said slide plate reciprocates between its limits of motion, said barrier/ramp moves between its retracted, raised, and extended positions, and a means disposed internally of said bottom step/outer panel and operatively connected to said slide plate for reciprocating said slide plate between its limits of motion to raise and lower said barrier/ramp.

2. The improved safety barrier/ramp actuating mechanism of claim 1 wherein said connecting linkage includes a drag link pivotally secured at a first end thereof to said slide plate and at the opposite second end thereof to a common pivot pin, a toggle link pivotally secured at a first end thereof to a pivot mount on said bottom step/outer panel and at the opposite second end thereof to said common pivot pin, the length of said toggle link being such as to keep the common pivot pin above the hinge axis of said barrier/ramp when it is lowered in the extended ramp position, and a barrier/ramp grab link pivotally secured at a first end thereof to said barrier/ramp panel at a position displaced from said pivot/hinge axis, the opposite second end of said grab link being pivotally secured to said common pivot pin.

3. The improved safety barrier/ramp actuating mechanism of claim 1 wherein said means for reciprocating said slide plate includes a horizontally disposed bellcrank pivotally secured internally of said bottom step/outer panel intermediate the ends of said bellcrank on the crank end thereof, a connecting rod interconnecting a first end of said bellcrank and said slide plate, and means for pivoting said bellcrank to reciprocate said slide plate.

4. The improved safety barrier/ramp actuating mechanism of claim 3 wherein said means for pivoting said bellcrank includes a hydraulic cylinder arranged for partially rotating a second end of said bellcrank, and a hydraulic pump and hydraulic fluid circuit for powering said cylinder.

5. The improved safety barrier/ramp actuating mechanism of claim 4 including a pressure relief fluid bypass valve in the hydraulic fluid circuit which actuates said cylinder whereby at least when the barrier/ramp is disposed in extended horizontal ramp position and a load is imposed on said barrier/ramp in excess of a preselected limit, said hydraulic fluid circuit pressure relief valve actuates and fluid bypasses said cylinder and recirculates to a fluid reservoir for said hydraulic pump preventing said barrier/ramp from pivoting about said pivot/hinge axis to the raised position.

6. The improved safety barrier/ramp actuating mechanism of claim 5 including a proximity sensor switch which senses the proximity of a moving element of the actuating mechanism when said barrier/ramp is disposed in the vertically projecting position and activates a solenoid which stops hydraulic fluid flow to said cylinder to hold said barrier/ramp in said vertically projecting position.

7. The improved safety barrier/ramp actuating mechanism of claim 5 wherein the hydraulic circuit for said cylinder includes two alternative orifices which are remotely operator logic circuit selected: one large orifice for step to barrier and return movement of said barrier/ramp panel whereby relatively fast transition between said configurations is effected; and one small orifice for barrier to ramp and return movement of said barrier/ramp panel whereby relatively slow transition between said configurations is effected.

8. An improved safety barrier/ramp actuating mechanism for combination folding stair and platform wheelchair lifts which translate from one configuration to the other depending upon the purpose to be served, said combination stair and lift having a horizontally disposed panel forming both the bottom step of the folding stair configuration of said combination as well as the outer horizontally projecting lift panel of the platform configuration of said combination depending upon in which configuration of the stairs or platform the combination has been positioned, said combination including a safety barrier/ramp panel which is pivotally hinged proximate to the outer edge of said horizontally disposed bottom step/outer panel, said barrier/ramp being disposed in a retracted substantially horizontal position folded flat against said bottom step on top thereof and acting as a tread for the lower stair step of said folding stair configuration, said barrier/ramp being pivotable to a substantially vertical projecting raised barrier position and subsequently to a substantially horizontal extended position in a ramp configuration at the end of said outer panel when said lift is disposed in said platform configuration, the improved safety barrier/ramp actuating mechanism comprising

- a slide plate disposed internally of said bottom step/outer panel and arranged to reciprocate horizontally and perpendicular to the pivot or hinge axis of said barrier/ramp,
- a connecting linkage secured between said slide plate and said barrier/ramp, said linkage including
  - a drag link pivotally secured at a first end thereof to said slide plate and at the opposite second end thereof to a common pivot pin,
  - a toggle link pivotally secured at a first end thereof to a pivot mount and at the opposite second end thereof to said common pivot pin, and
  - a barrier/ramp grab link pivotally secured at a first end thereof to said barrier/ramp panel at a position displaced from said hinge connection to said outer panel, the opposite second end of said grab link being pivotally secured to said common pivot pin, whereby as said slide plate reciprocates between its limits of motion, said barrier/ramp moves between its retracted, raised, and extended positions,

- a horizontally disposed bellcrank pivotally secured internally of said bottom step/outer panel intermediate the ends of said bellcrank on the crank end thereof,
- a connecting rod interconnecting a first end of said bellcrank and said slide plate,
- a hydraulic cylinder arranged for partially rotating the second end of said bellcrank whereby operation of said cylinder reciprocates said slide plate between its limits of motion to raise and lower said barrier/ramp, and
- a hydraulic pump for powering said cylinder,
- a proximity sensor switch which senses the proximity of a moving element of the actuating mechanism when said barrier/ramp is disposed in the vertically projecting position and stops hydraulic fluid flow to said cylinder to hold said barrier/ramp in said position, and
- a pressure relief fluid bypass valve in a closed loop hydraulic fluid circuit connected with the output of said pump for recirculating hydraulic fluid when a load is imposed on said barrier/ramp panel in excess of a preselected limit when it is disposed in the ramp position.

* * * * *